United States Patent
Feke et al.

(10) Patent No.: US 7,171,063 B2
(45) Date of Patent: Jan. 30, 2007

(54) CONTROLLABLE ELECTRO-OPTIC DEVICE HAVING SUBSTRATE TRENCHES BETWEEN ELECTRODES

(75) Inventors: Gilbert D. Feke, West Simsbury, CT (US); Hirotoshi Nagata, Avon, CT (US); Karl Kissa, West Simsbury, CT (US)

(73) Assignee: JDS Uniphase Corporation, Milpitas, CA (US)

( * ) Notice: Subject to any disclaimer, the term of this patent is extended or adjusted under 35 U.S.C. 154(b) by 279 days.

(21) Appl. No.: 11/001,440

(22) Filed: Dec. 1, 2004

(65) Prior Publication Data

US 2006/0115196 A1 Jun. 1, 2006

(51) Int. Cl.
*G02F 1/035* (2006.01)
*G02B 6/26* (2006.01)
*G02B 6/42* (2006.01)

(52) U.S. Cl. .................. 385/2; 385/14; 385/4; 385/8; 385/1; 385/3; 385/39; 385/40; 385/129; 385/130; 385/131; 385/132

(58) Field of Classification Search .............. 385/1, 385/2, 3, 4, 8, 14, 39, 40, 129, 130, 131, 385/132
See application file for complete search history.

(56) References Cited

U.S. PATENT DOCUMENTS

| | | | |
|---|---|---|---|
| 5,790,719 A | 8/1998 | Mitomi et al. .............. 385/2 |
| 6,069,729 A | 5/2000 | Gill et al. .................. 359/245 |
| 6,449,080 B1 | 9/2002 | McBrien et al. ............. 359/245 |
| 6,544,431 B2 | 4/2003 | Gill et al. .................... 216/87 |
| 6,545,791 B1 | 4/2003 | McCaughan et al. ........ 359/245 |
| 6,580,843 B2 | 6/2003 | Doi et al. ..................... 385/14 |
| 6,584,240 B2 | 6/2003 | Doi et al. ...................... 385/2 |
| 6,721,085 B2 | 4/2004 | Sugiyama et al. .......... 359/322 |
| 6,801,675 B2 | 10/2004 | Doi et al. ...................... 385/3 |
| 6,845,183 B2* | 1/2005 | Cheung et al. ................. 385/2 |
| 6,865,306 B2 | 3/2005 | Doi et al. ..................... 385/14 |
| 2004/0151414 A1 | 8/2004 | Cheung et al. ................. 385/2 |
| 2006/0115196 A1* | 6/2006 | Feke et al. ..................... 385/2 |

OTHER PUBLICATIONS

K. Noguchi, et al., "Millimeter-Wave TiLiNbO3 Optical Modulators," IEEE Journal of Lightwave Technology, vol. 16, No. 4, Apr. 1998, p. 615-619.

* cited by examiner

*Primary Examiner*—Brian M. Healy
(74) *Attorney, Agent, or Firm*—Allen, Dyer, Doppelt, Milbrath & Gilchrist, P.A.

(57) ABSTRACT

An optical modulator which has substantially low loss and has an improvement in voltage reduction is disclosed having an electro-optic lithium niobate substrate. The substrate has first, second and third ridges extending along its surface. Extending along the first and second ridges are first and second waveguides. A first RF electrode extends over the first waveguide and a second slotted electrode including a first section extends over the second waveguide. A second section of the slotted extends parallel to and adjacent to the first section on the third ridge. In summary, this invention provides a slotted ground electrode wherein a slot is formed in the substrate between the slotted electrode.

18 Claims, 17 Drawing Sheets

Fig. 12b
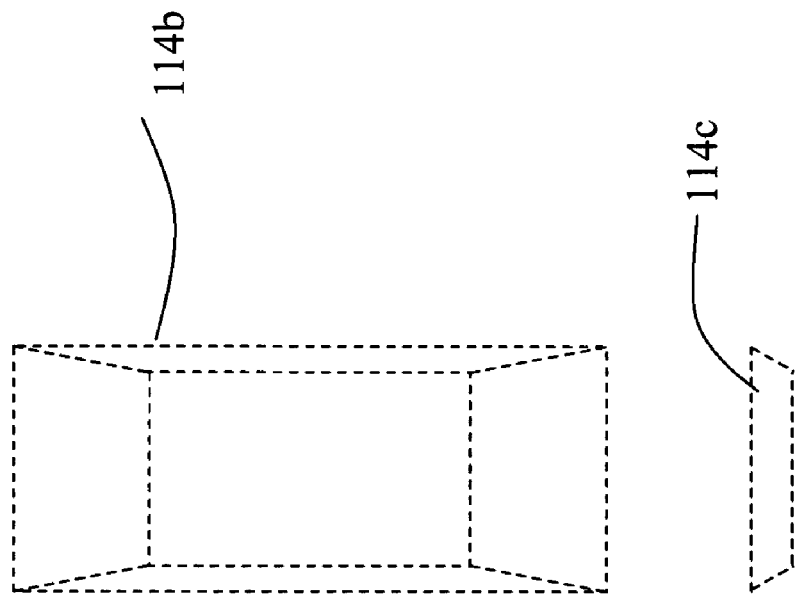
Top View
End View
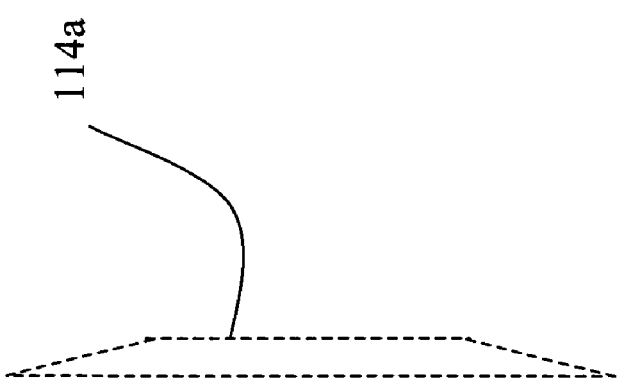
Side View

CONTROLLABLE ELECTRO-OPTIC DEVICE HAVING SUBSTRATE TRENCHES BETWEEN ELECTRODES

FIELD OF THE INVENTION

The present invention relates to improvements in electro-optic devices such as modulators. A particular aspect of the present invention relates to methods and apparatus for reducing bias point sensitivity to ambient temperature and an applied RF signal in an electro-optic modulator while ensuring adequate high-speed performance.

BACKGROUND OF THE INVENTION

FIG. 1 shows the top view of a prior art z-cut lithium niobate modulator 2, consisting of an optical waveguide 4 that is split into two paths 4a and 4b, which are recombined later, along with a traveling-wave set of electrodes. The two waveguides 4a and 4b form the arms of a Mach-Zehnder interferometer. The electrodes consist of a signal electrode 5a, which is positioned directly over top of one of the waveguides 4a, and two ground electrodes 5b, 5c, one of which, 5b is on top of the second waveguide 4b. In operation, the field from the electrodes creates a difference in optical phase between the two arms of the interferometer in response to an applied voltage. The constructive and destructive interference between the optical waves in the two waveguides creates intensity modulation in response to the voltage. In normal operation, a DC bias voltage is applied along with the high-speed modulation voltage. The slowly varying bias voltage is used to set the interferometer nominally to the half power point, in the absence of modulation voltage. The bias voltage tracks changes in differential optical phase occurring over time, maintaining the interferometer nominally at the half power point or quadrature point. If the changes in differential optical phase are large, perhaps due to changes in ambient temperature, then the required bias voltage Vb will become exceedingly large, causing a failure or errors in transmission of digital or analog signals. A Z-cut modulator is described in U.S. patent application Ser. No. 10/720,796 incorporated herein by reference. Other prior art patents in a similar field of endeavor are U.S. Pat. Nos. 5,790,719; 6,544,431; 6,584,240 and 6,721,085 incorporated herein by reference.

Referring now to FIG. 2, a cross-sectional view of a portion of a conventional Mach Zehnder interferometer modulator is shown, with three coplanar strip electrodes 10, 12 and 14 having only a single drive voltage. This externally modulated system has a Z-cut LiNbO3 substrate, which requires a lower drive voltage than is generally required for modulators having an X-axis or X-cut crystal orientation. The Z-cut LiNbO3 substrate has an electro-optical effect, which provides a broadband low drive voltage modulator. The electrodes are shown to be disposed over waveguides 15 and 17. The Z-cut lithium niobate modulator has no slots in the substrate. A buffer layer partially isolates the electrodes from the substrate. The high permittivity of the substrate lowers electrode impedance and microwave velocity to undesirably low values. The isolating effect of the buffer layer restores desired impedance and microwave velocity at the expense of modulation efficiency. An impedance of 40 to 50 Ohms is desirable for efficient transfer of power from the driver circuit to the modulator. In addition, the microwave velocity is typically designed to be the same as the optical velocity, in order to obtain the largest possible modulator bandwidth for the selected electrode length. The buffer layer also isolates the electrode optically from the waveguides. The electrodes would dramatically increase the loss of light in the waveguide, if they were formed directly on top of the waveguides.

Referring now to FIG. 3, a prior art modulator similar to one described by K. Noguchi, et al., "Millimeter-wave TiLiNbO3 optical modulators," IEEE Journal of Lightwave Technology, Vol. 16, No. 4, April 1998, pp. 615–619, is shown. The surface of the substrate 30 is etched or machined everywhere except where the waveguides 32, 34 are located. The removal of the substrate creates ridges 35a, 35b containing the waveguides 32, 34 which confine the field flux from the electrodes to the waveguide region, thereby increasing the amount of modulation. These ridges 35a, 35b also increase the impedance and velocity, allowing for a thinner buffer layer, and hence, further reduction in drive voltage. Finally, the ridges 35a, 35b can narrow the optical beam width in the waveguide, resulting in some further incremental improvement in modulation efficiency. The term ridge used within this specification is to mean a long narrow elevation or striation. In accordance with this specification, a ridge has at least one valley or slot below its peak or plateau. In some instances a ridge may have a slot or valley on both sides of its peak or crest. For example three ridges $R_1$, $R_2$ and $R_3$ that are disposed adjacent and parallel to one another have at least two valleys $V_1$, $V_2$ therebetween, as follows: $R_1$ $V_1$ $R_2$ $V_2$ $R_3$. Notwithstanding, three ridges $R_1$ $R_2$ and $R_3$ adjacent and parallel to one another may have four valleys adjacent thereto, as follows: $V_1$ $R_1$ $V_2$ $R_2$ $V_3$ $R_3$ $V_4$, or may have three valleys $V_1$ $R_1$ $V_2$ $R_2$ $V_3$ $R_3$ or $R_1$ $V_1$ $R_2$ $V_2$ $R_3$ $V_3$.

The waveguide regions and ridges shown in FIG. 3 protrude from the surface of the substrate, making them more prone to damage during wafer processing. In addition, the narrow signal electrode 34a is higher than the ground electrode 34c on the left, making it more prone to damage during wafer processing. It is desirable to have the signal electrode 34a lower in height than either ground electrode 34b or 34c. In such as case, the ground electrodes provide protection for the narrow signal electrode 34a.

FIG. 4 shows another prior art modulator developed at JDS Uniphase having slots 40a, 40b defined in the substrate to reduce the modulation drive voltage. The slots are located in the electrode gaps between the signal electrode 42 and ground electrodes 44a, 44b. The provision of slots by removal or etching of material is a simpler process than the provision of ridges by growing electro-optic material where ridges are to be provided; notwithstanding, both techniques are within the scope of the present invention. The drive voltage reduction is nearly the same as with ridges, for a given electrode impedance and microwave velocity. In FIG. 4, the signal electrode 42 is always the same height or lower than either ground 44a or 44b, making the design more robust to wafer processing. FIG. 5 shows another prior art modulator with narrow slots 51a, 51b, 51c, 51d described in U.S. Pat. No. 6,545,791, designed for reducing the modulation voltage.

It is found that the design shown in FIG. 4 is more efficient than the design of FIG. 5. In general, the deeper and wider the slots, and more the lithium niobate that is removed, the greater the voltage reduction that is possible. However, there are fabrication limits to the depth of the slots. In addition, the presence of the slots and thinner buffer increases optical loss in the waveguide. Hence, there is a trade-off between voltage improvement and increase in optical loss.

It is an object of this invention to provide modulator which has substantially low loss and has an improvement in voltage reduction.

SUMMARY OF THE INVENTION

In accordance with this invention a controllable optical device is provided comprising an electro-optic substrate including first, second and third ridges extending along a surface thereof;

first and second waveguides extending within the first and second ridges, respectively;

a first electrode extending over the first waveguide; and, a second slotted electrode including a first section extending over the second waveguide, and a second section electrically coupled to the first section extending parallel to and adjacent to the first section on the third ridge.

In accordance with the invention there is further provided, an electro-optic modulator comprising:

a z-cut electro-optic substrate including first, second and third ridges extending along a surface thereof;

first and second waveguides extending within the first and second ridges, respectively, the waveguides configured as Mach Zehnder interferometer;

a first electrode extending over the first waveguide; and, a second slotted electrode including a first section extending over the second waveguide, and a second section electrically coupled to the first section extending parallel to and adjacent to the first section on the third ridge, wherein a plurality of conducting bridges span across a trench defined between the first section and the second section of the second slotted electrode.

In a very broad aspect of the invention, a controllable waveguide device is shown wherein a split ground electrode has a slot within the electro-optic substrate between the split electrodes.

BRIEF DESCRIPTION OF THE DRAWINGS

FIG. 12b shows a side and top view of a slot in accordance with this invention.

DETAILED DESCRIPTION OF THE PREFERRED EMBODIMENTS

Figure 6:
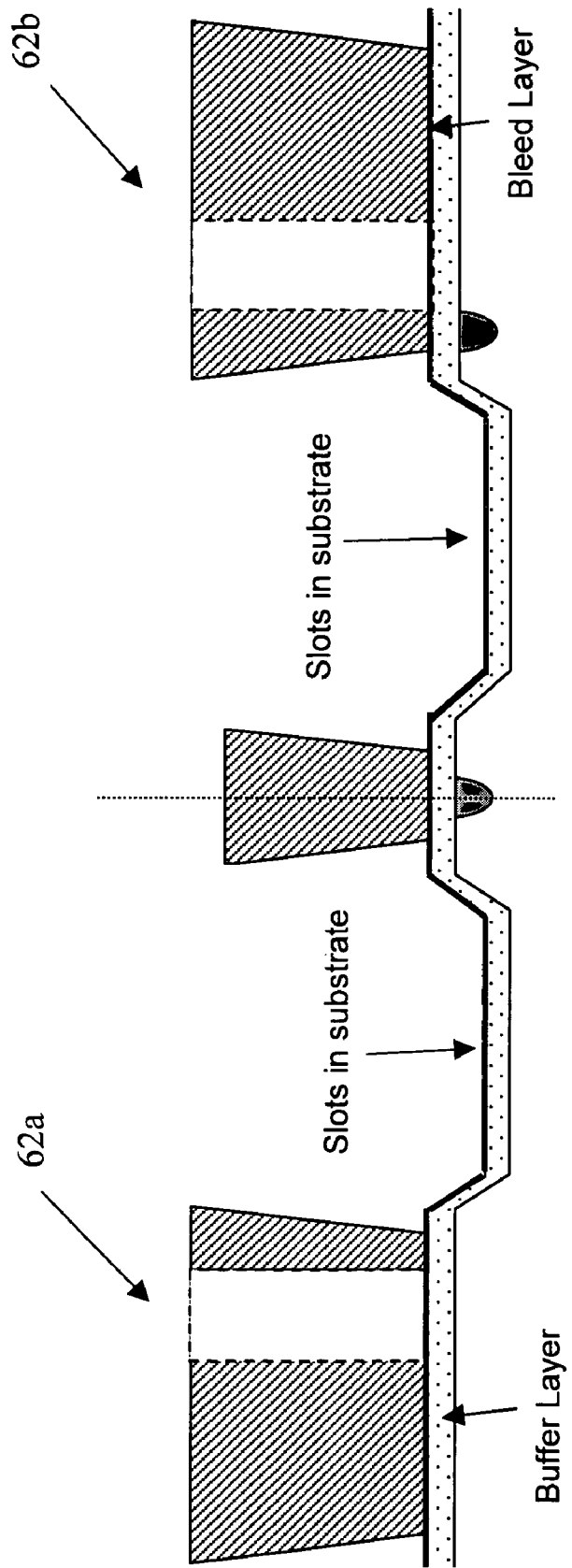
FIG. 6 is a cross sectional view of a prior art modulator having slots within the substrate and having slotted electrodes.
Figure 7:
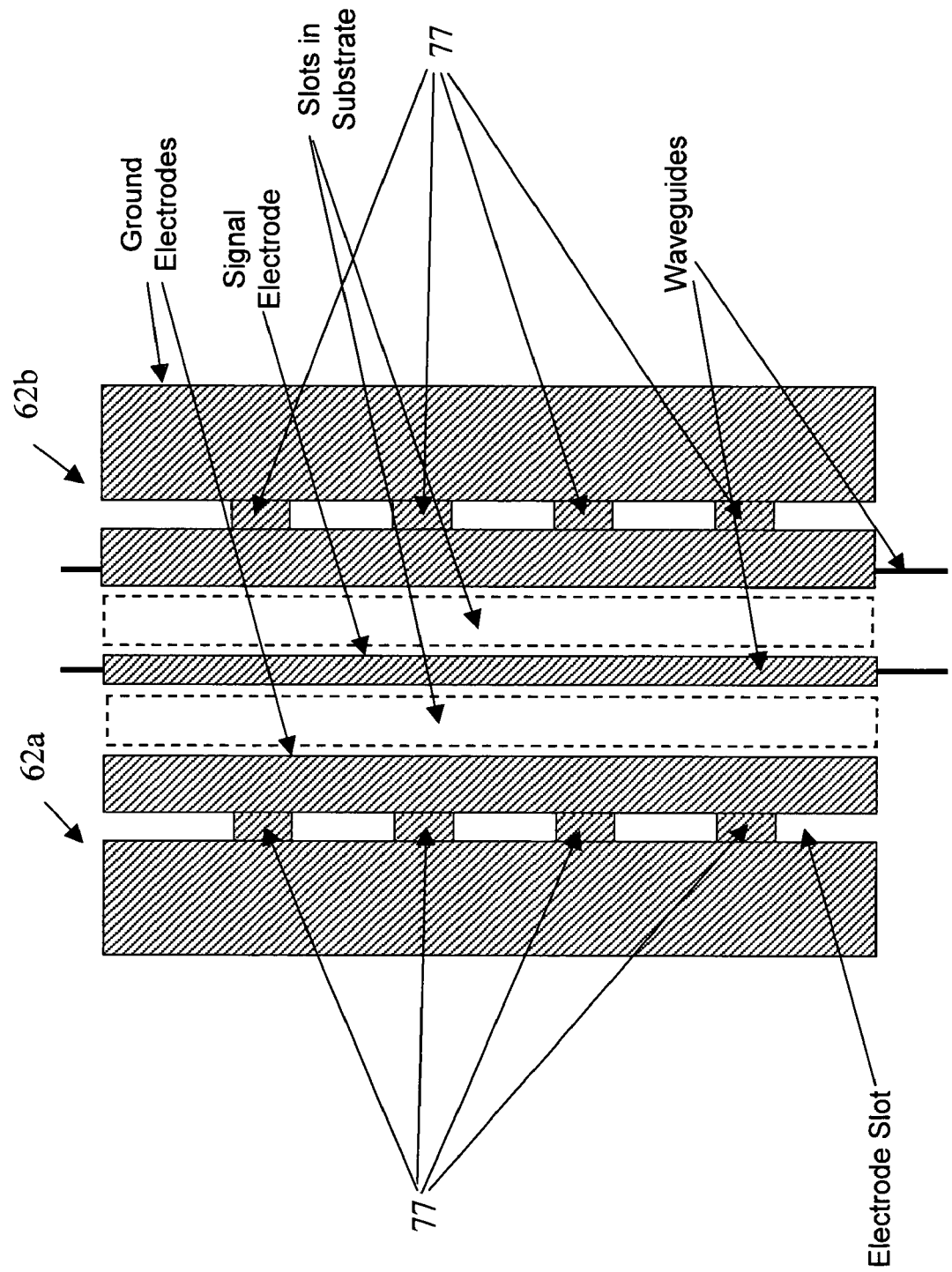
FIG. 7 is a top view of prior art FIG. 6.

FIGS. 6 and 7 show cross-sectional and top views, respectively, of a modulator that has a slotted ground electrode 62a, 62b, as described in U.S. patent application Ser. No. 10/720,796 to a same inventor as the instant application. The ground electrodes 62a, 62b are slotted in order to reduce the differential changes in mechanical stress imparted on the waveguides when the ambient temperature changes. Slotted ground electrodes are described in U.S. Pat. No. 6,449,080 in the name of McBrien et al. assigned to JDS Uniphase Corporation (San Jose, Calif.). Although slotted electrodes are two parallel electrodes separated by a gap, these electrodes may be electrically bridged at predetermined locations with conducting spans connecting the two split electrodes together intermittently. Notwithstanding, one large gap or a plurality of gaps are present between the two electrodes, defining a slot therebetween. FIG. 6 is exemplary of a conventional slotted electrode. FIG. 7 illustrates shorting bars 77 therebetween at predetermined locations.

Figure 1:
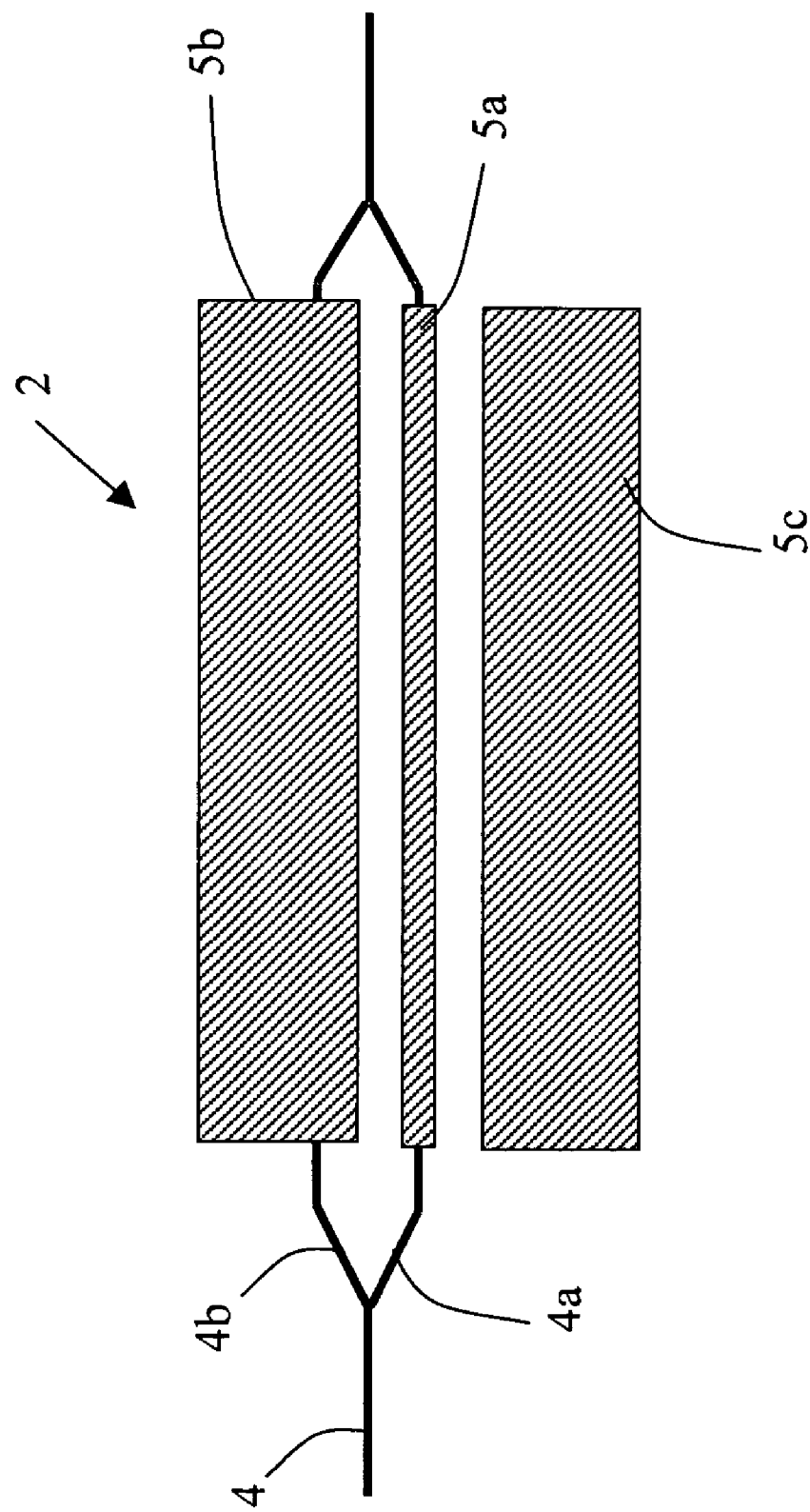
FIG. 1 is a top view of a prior art Mach Zehnder interferometer.
Figure 2:
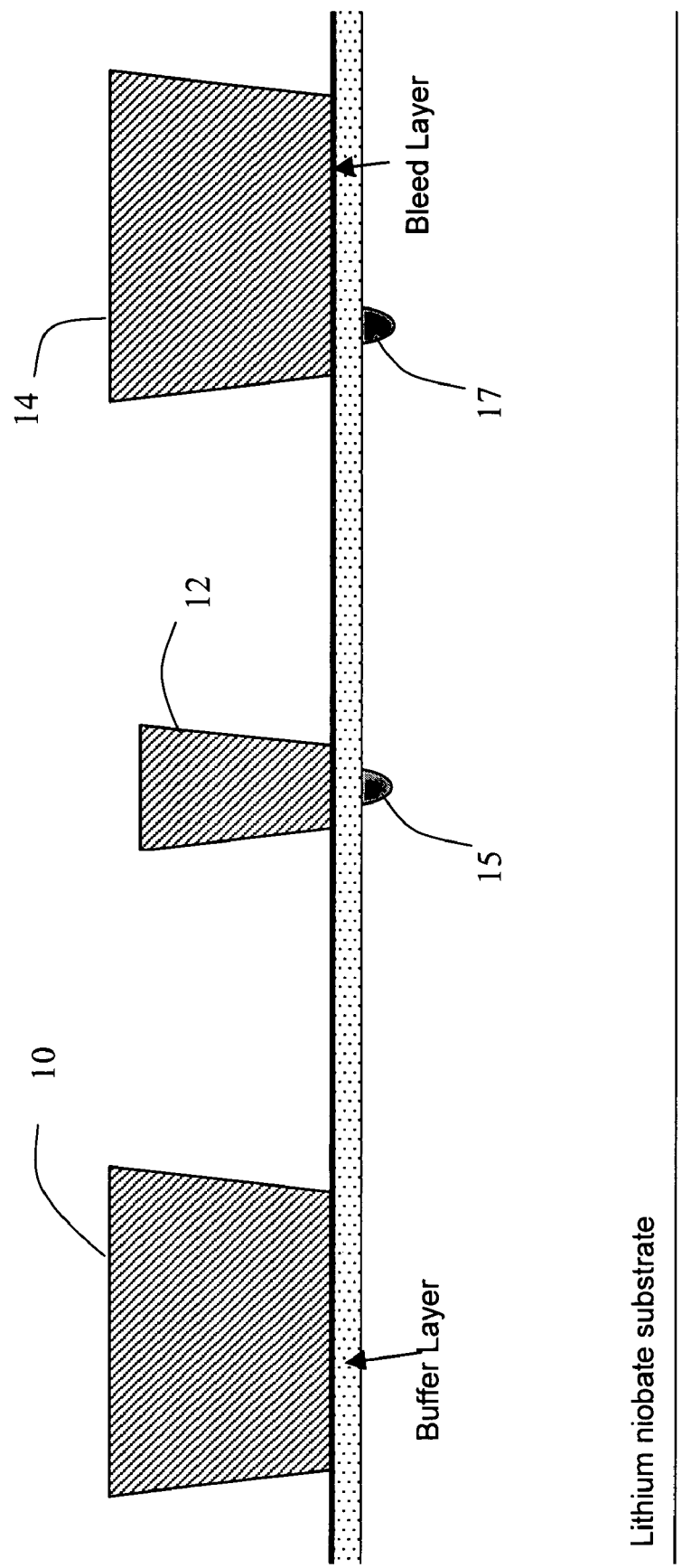
FIG. 2 is a cross-sectional view of a prior art as shown in FIG. 1
Figure 3:
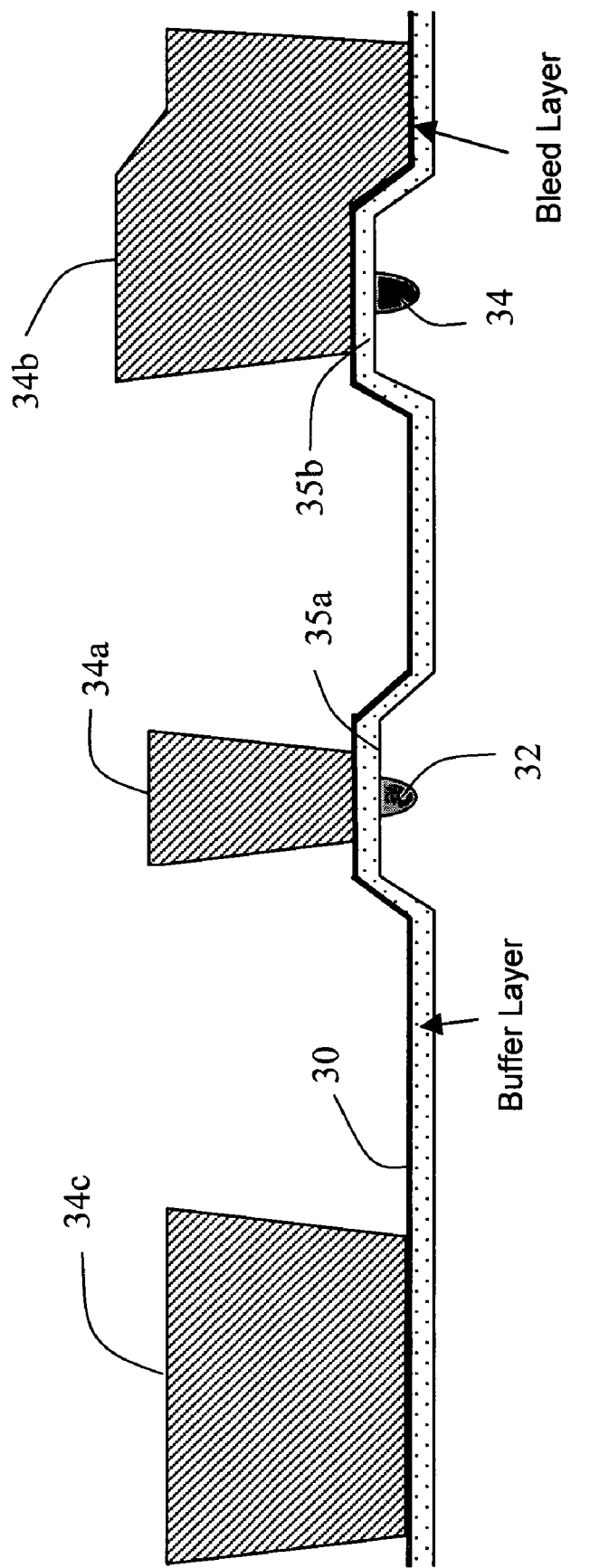
FIG. 3 is a cross-sectional view of a prior art modulator having a stepped ground electrode.
Figure 4:
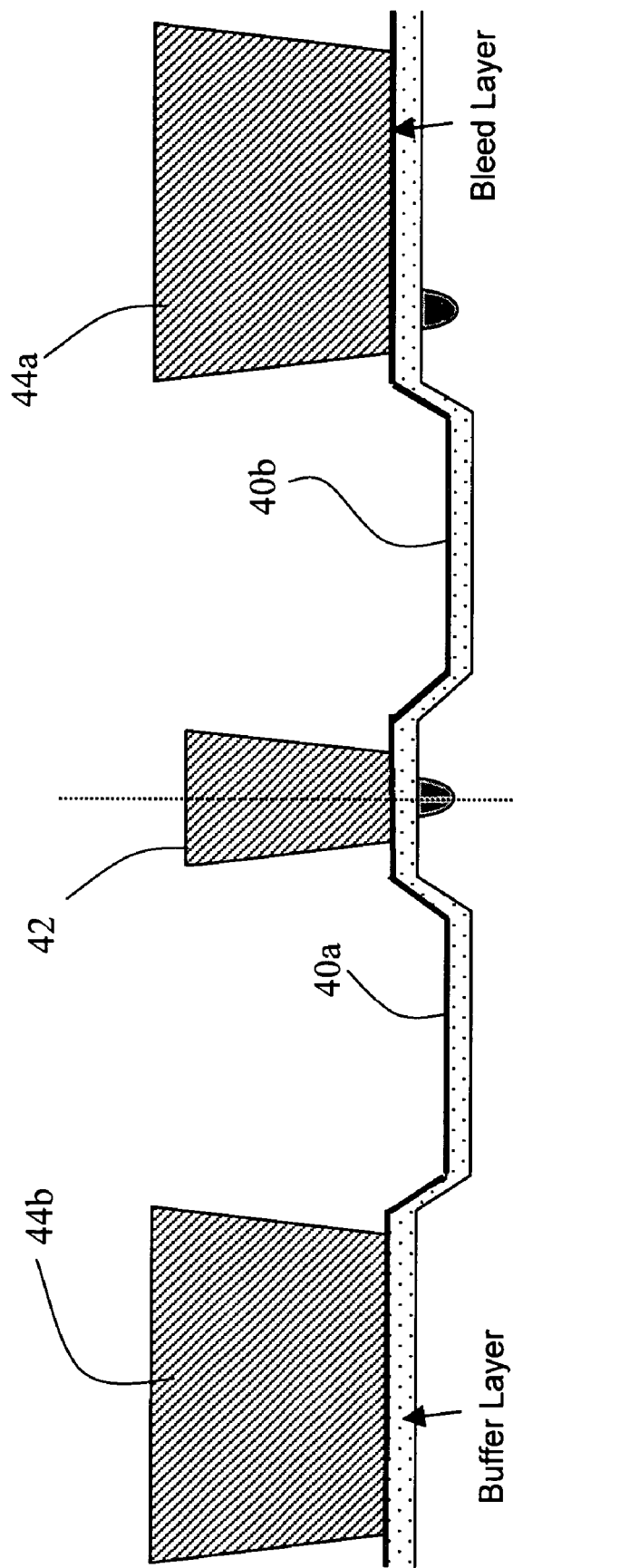
FIG. 4 is a cross-sectional view of a prior art modulator having an electro-optic substrate with high and low regions in the form of peaks or plateaus and valleys.
Figure 5:
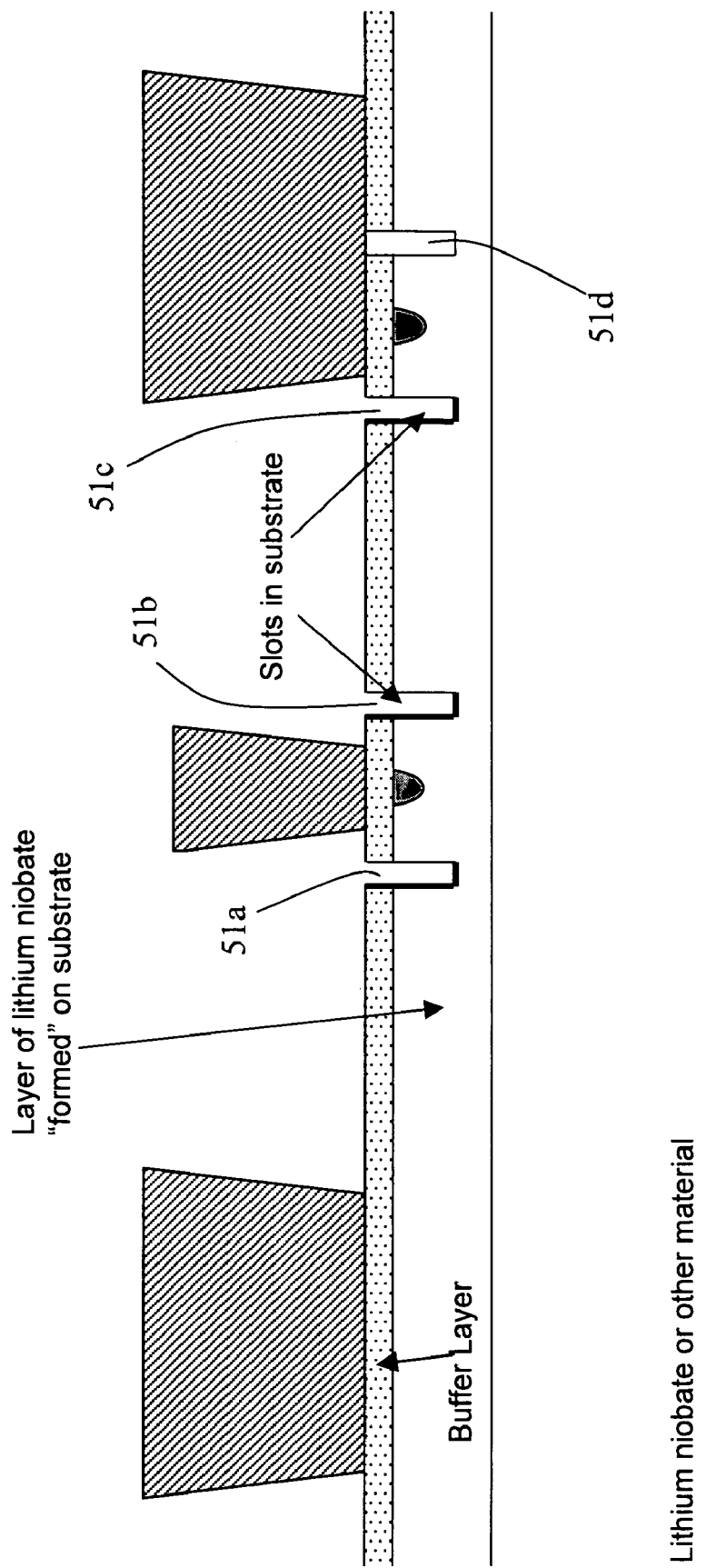
FIG. 5 is a cross sectional view of a prior art modulator having slots within the substrate.

One disadvantage of providing slots in the substrate as shown in FIGS. 4 and 6 is that the mechanical stress change over temperature is different for the two waveguide locations. The asymmetry in the topography of the substrate surface and buffer and bleed layer results in a differential stress change that leads to an optical phase differential that changes with temperature. This change in phase differential with temperature is usually referred to as bias point change over temperature. In addition, the asymmetry in the topography of the substrate surface and buffer and bleed layer results in a differential optical loss that leads to a decrease in device extinction ratio.

Figure 8:
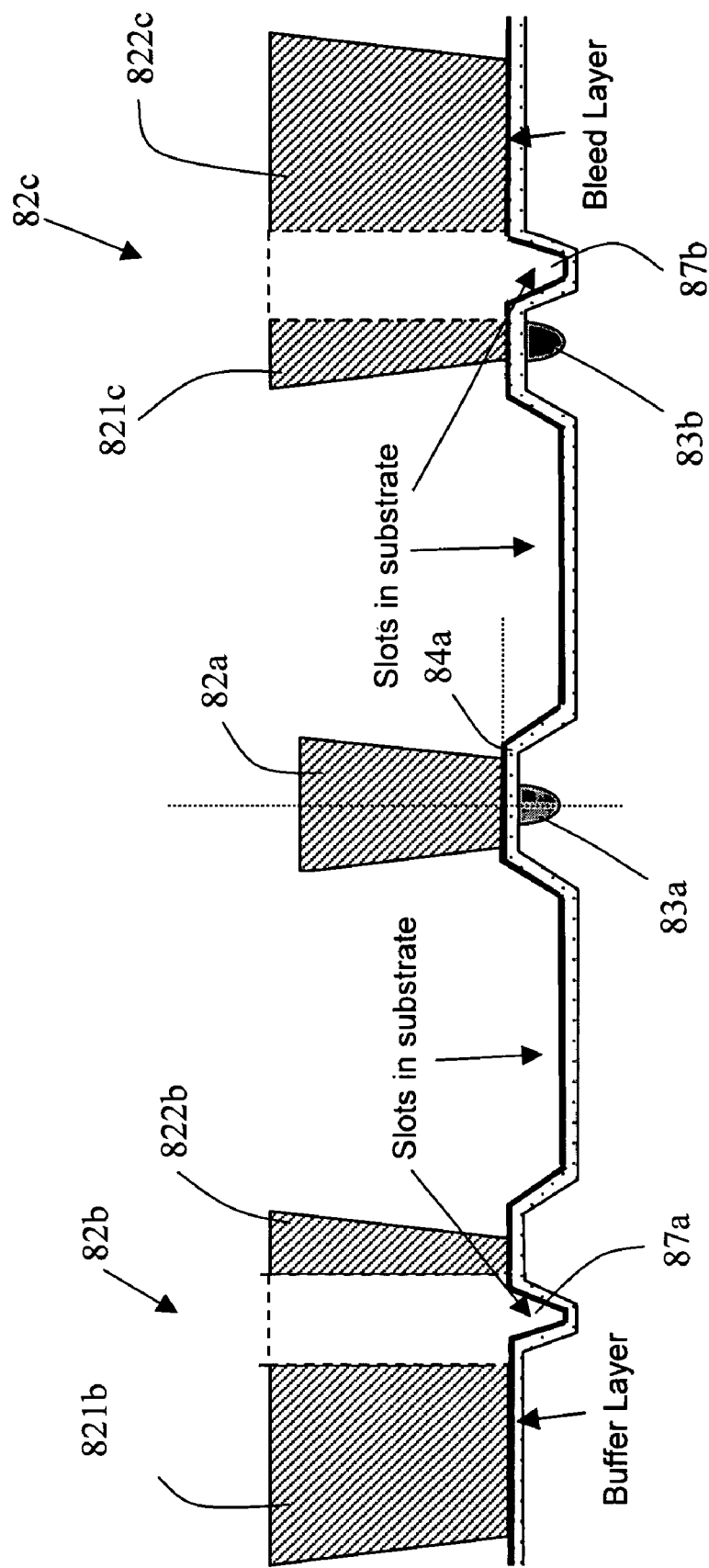
FIG. 8 is a cross-sectional view of a Mach Zehnder interferometer in accordance with this invention wherein slotted electrodes are provided and wherein the substrate is slotted between the slotted electrodes.
Figure 9:
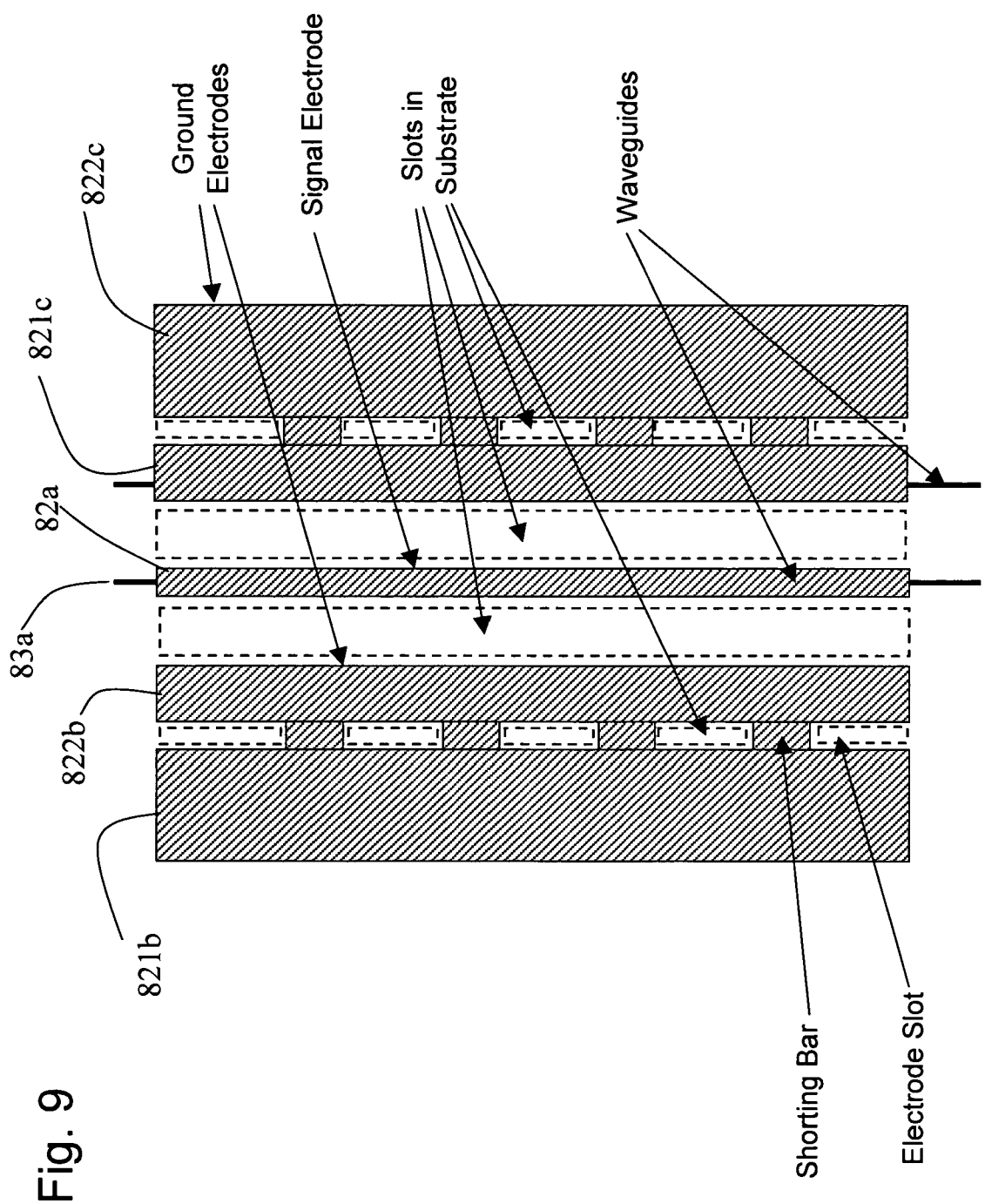
FIG. 9 is a top view of FIG. 8.

FIGS. 8 and 9 show cross-section and top views, respectively, of a modulator in accordance with a preferred embodiment of this invention. The views shown are not to scale. The substrate is slotted in a region 87a, 87b contained by the slot within the ground electrodes. The symmetrical structure of FIG. 8 shows a centrally disposed hot RF signal electrode 82a resting upon or supported by a ridge 84a having a waveguide 83a disposed therein. Two slotted electrodes 82b and 82c including respective portions 821b, 822b and 821c, 822c, are shown to be resting upon four ridges formed in the substrate. Therefore, valleys are formed between each one of the adjacent electrodes. Although the valleys or slots 87a and 87b shown between the slotted electrodes 82b and 82c are approximately ¼ of the width of the slot shown between the two waveguides 83a and 83b, it is preferred that slots 87a and 87b have a width of ½ to 2 times the width of the slots on either side of the signal electrode. The advantages of this design over the prior art are that the stress changes over temperature are reduced in both the electrode and substrate, and the differential optical loss is suppressed or eliminated.

Figure 10:
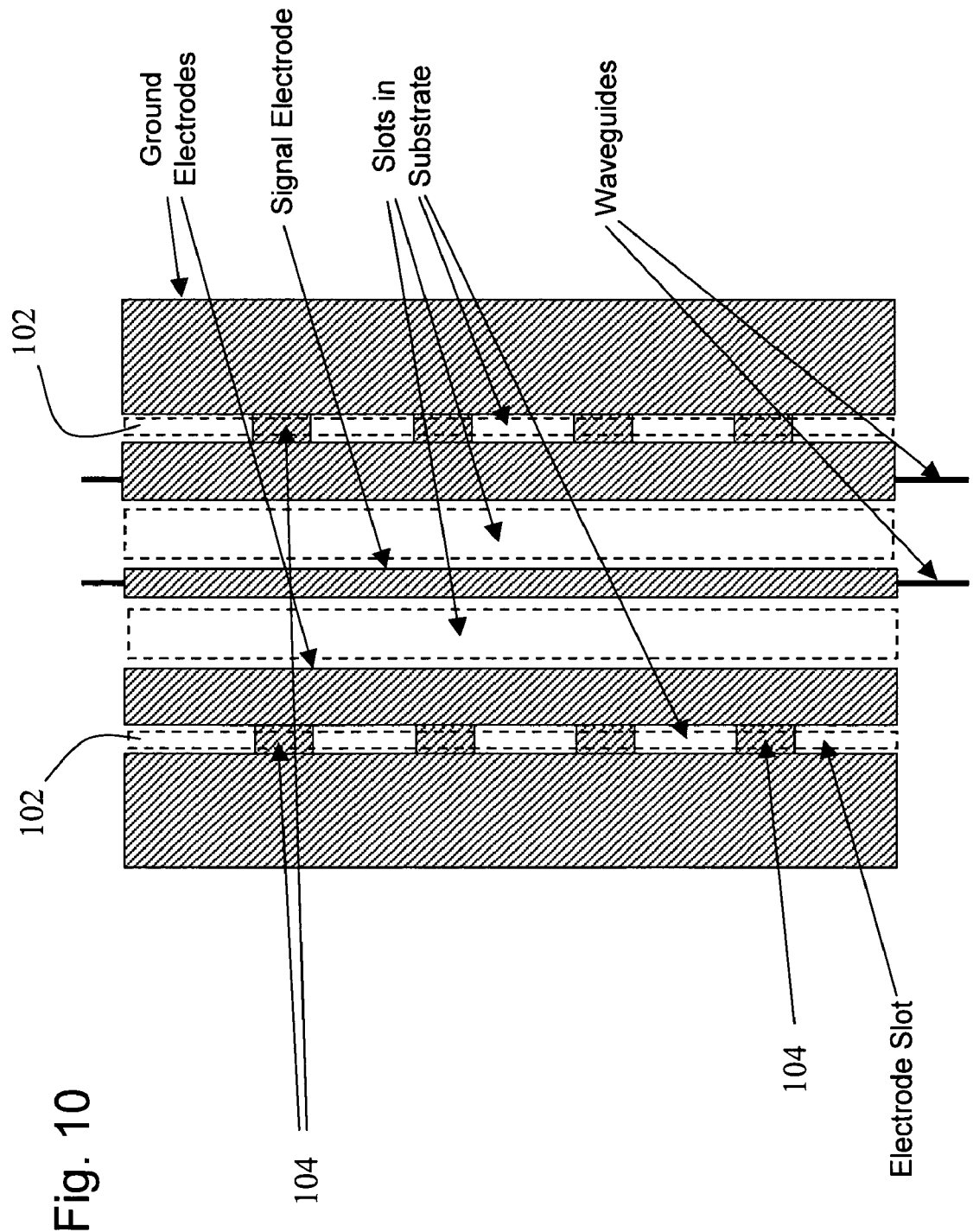
FIG. 10 is an alternative embodiment of the invention where the substrate slots underneath the ground electrodes are continuous instead of segmented.

FIG. 10 shows another embodiment of the invention where the substrate slots 102 underneath the ground electrodes are continuous instead of segmented. The shorting bars 104 must traverse the slot and maintain electrical continuity across it. This design may be more difficult to manufacture then the design in FIG. 9, however, the continuous slots eliminate any stress in the substrate created by the un-etched region under the shorting bars 104.

Figure 11:
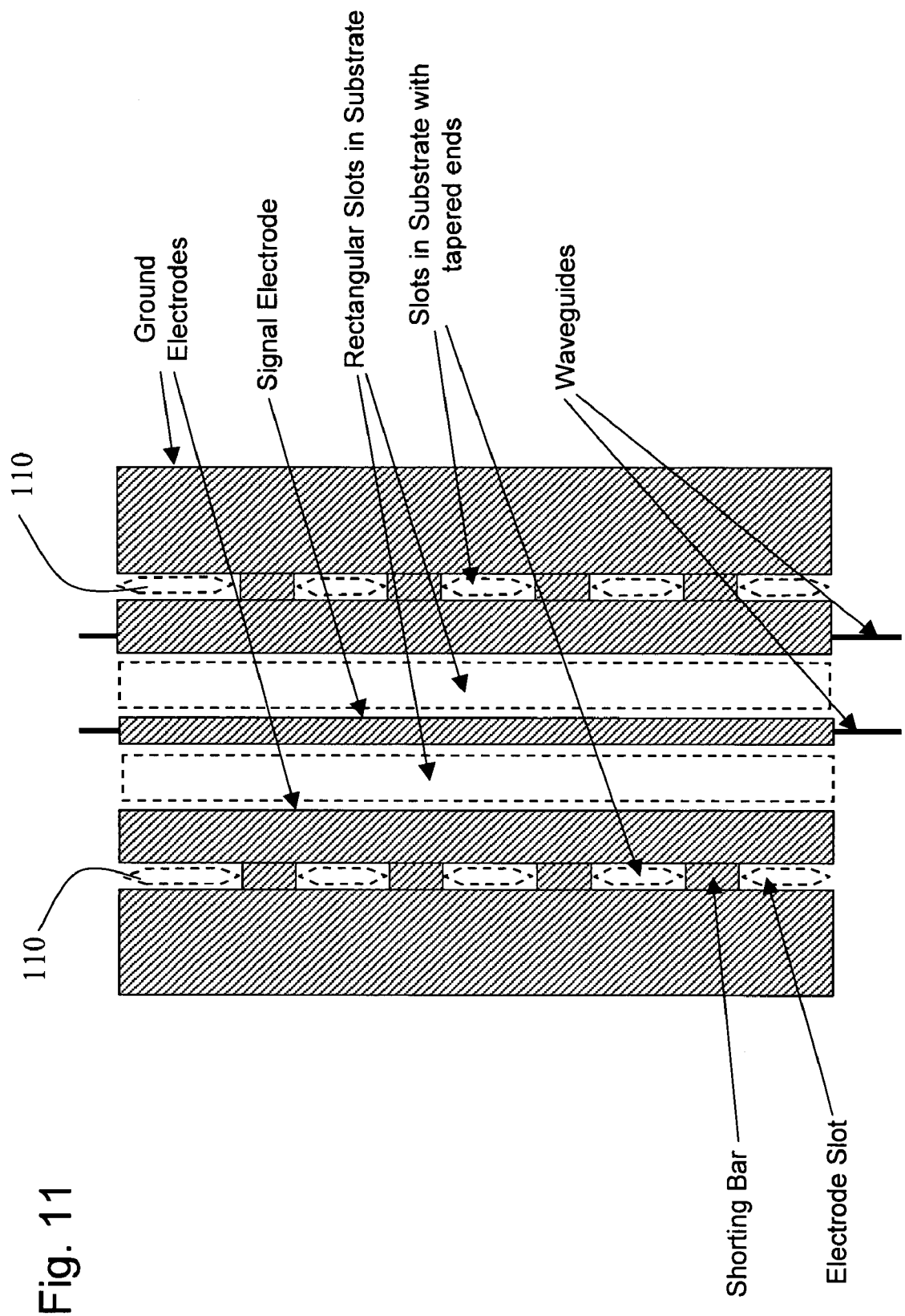
FIG. 11 shows an alternative embodiment of the invention wherein etched slots in the substrate within the ground electrode slots have tapers at their ends.
Figure 12A:
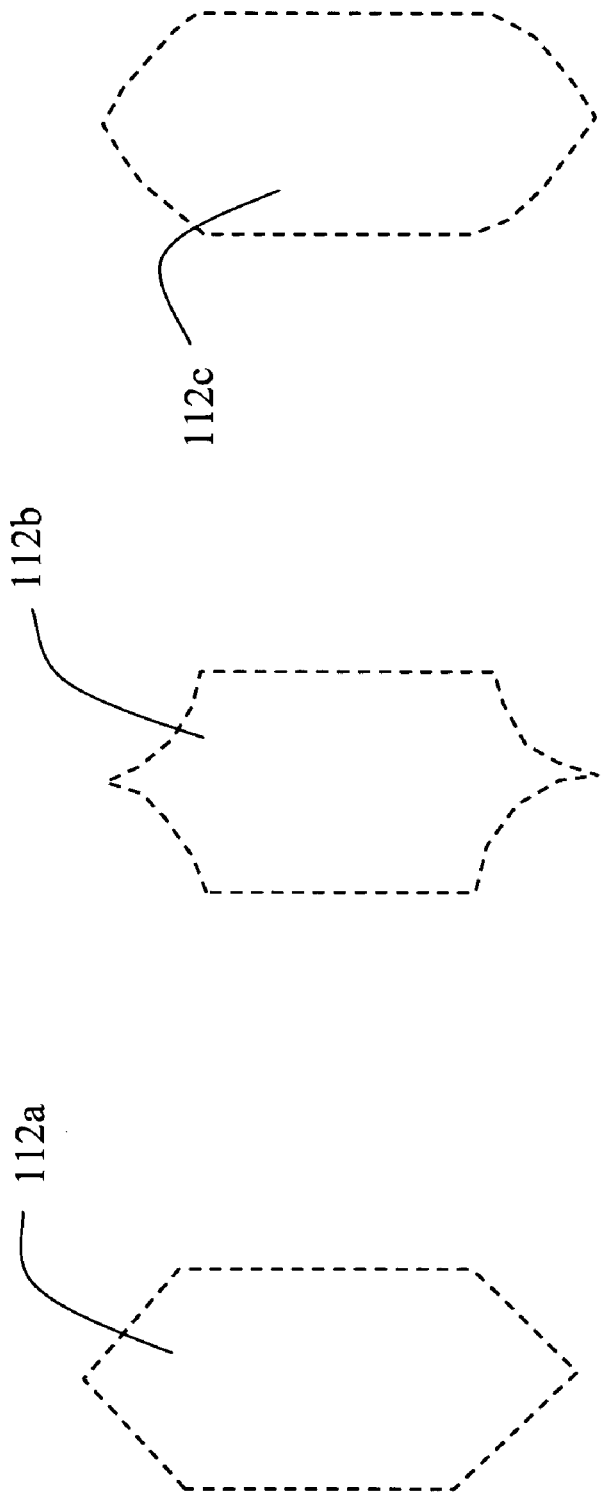
FIG. 12a is a top view of three tapered slots having different end features.

FIG. 11 shows etched slots 110 in the substrate within the ground electrode slots that have tapers at the ends. The tapering may either be with respect to the width of the slot, or with respect to the depth of the slot. An enlarged view of the slots 112a, 112b, and 112c in FIG. 12a shows different types of tapering with respect to the width of the slot. An enlarged view of a slot 114a in side view, 114b in top view and 114c in end view in FIG. 12b shows tapering with respect to the depth of the slot. The tapered slots attempt to prevent the bleed layer from becoming too thin near the periphery of the slot. The slot 114a has a shallow end wall 116 to promote bleed continuity; notwithstanding the end wall is not so shallow as to detract from the primary function of the slot; that is, to balance mechanical stress along the length of the slot; or not so shallow as to detract from the primary function of the trench adjacent to the hot electrode for reduction in voltage Vpi. Turning now to the end view the slot 114c is shown to have a relatively steep side wall to achieve sufficient voltage (Vpi) reduction for a given trench depth; for example about a 70 degree incline.

Figure 13:
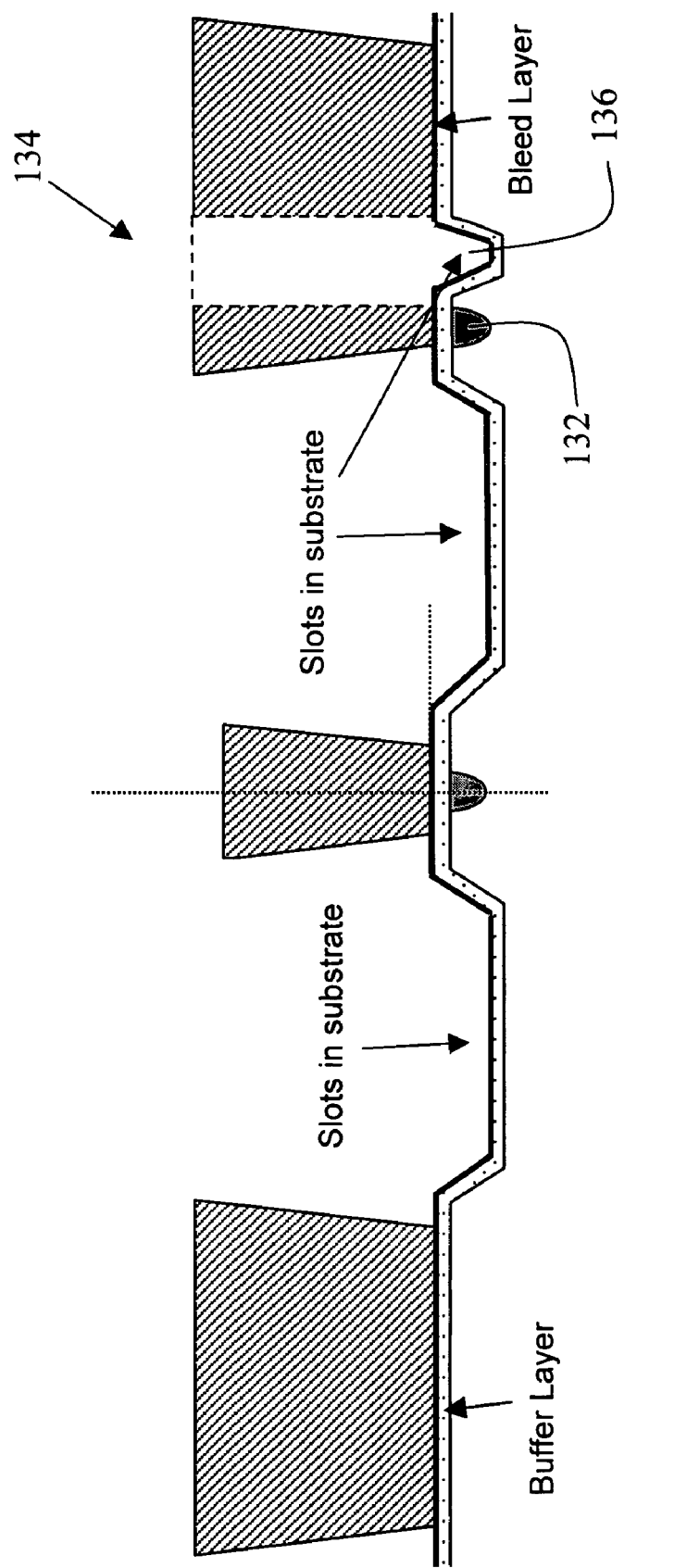
FIGS. 13 and 14 show a cross section and top view, respectively, of an embodiment of the invention of a single slot design where only the ground electrode near the second waveguide is slotted.
Figure 14:
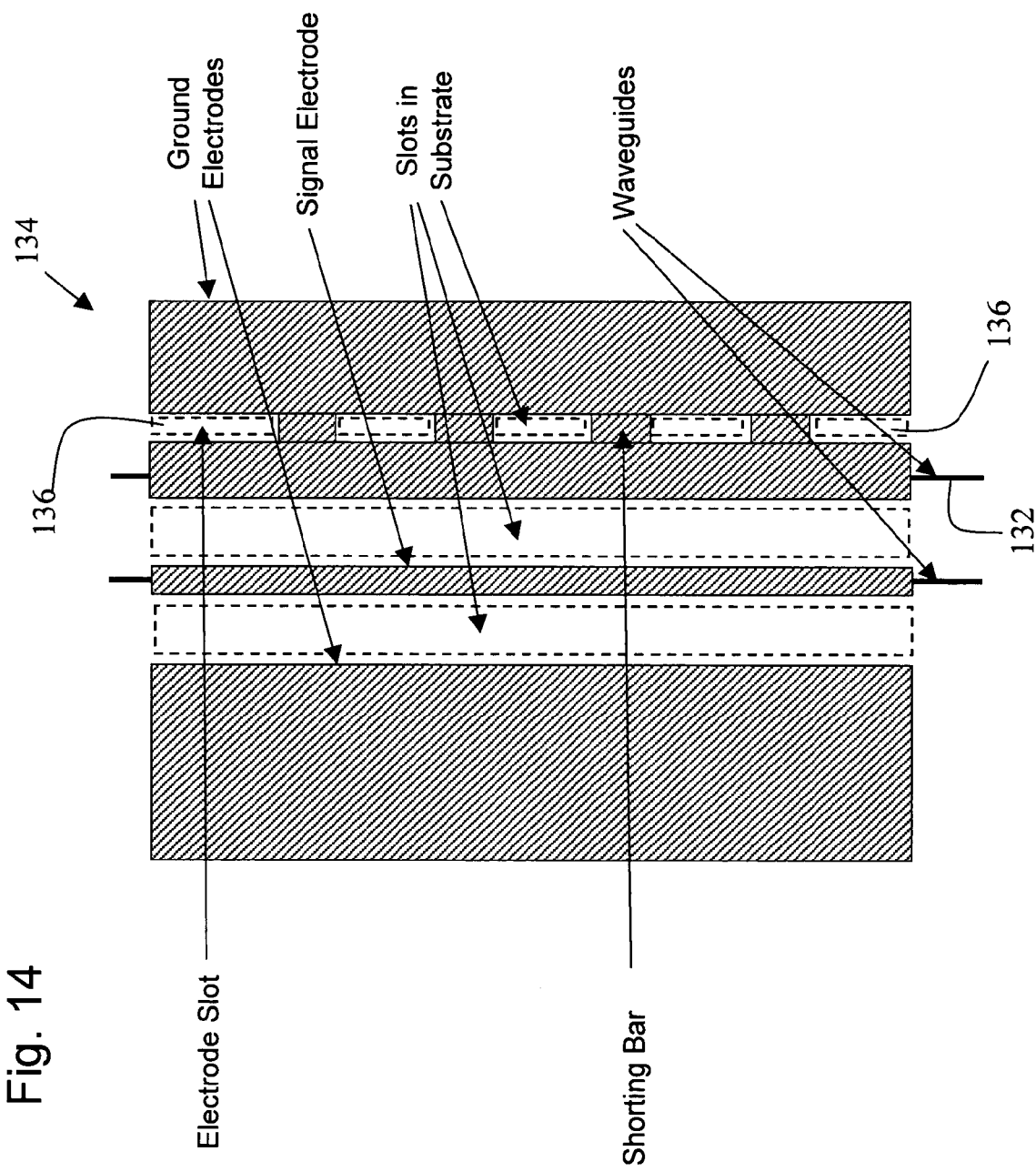

The cross section and top views in FIGS. 13 and 14, respectively, show a single slot design where only the ground electrode 134 near the second waveguide 132 is slotted. In accordance with this embodiment having only a single slotted electrode, only one set of stress relieving slots 136 in the substrate are included, which are located within the region enclosed by the slots in the ground electrode 134.

Figure 15:
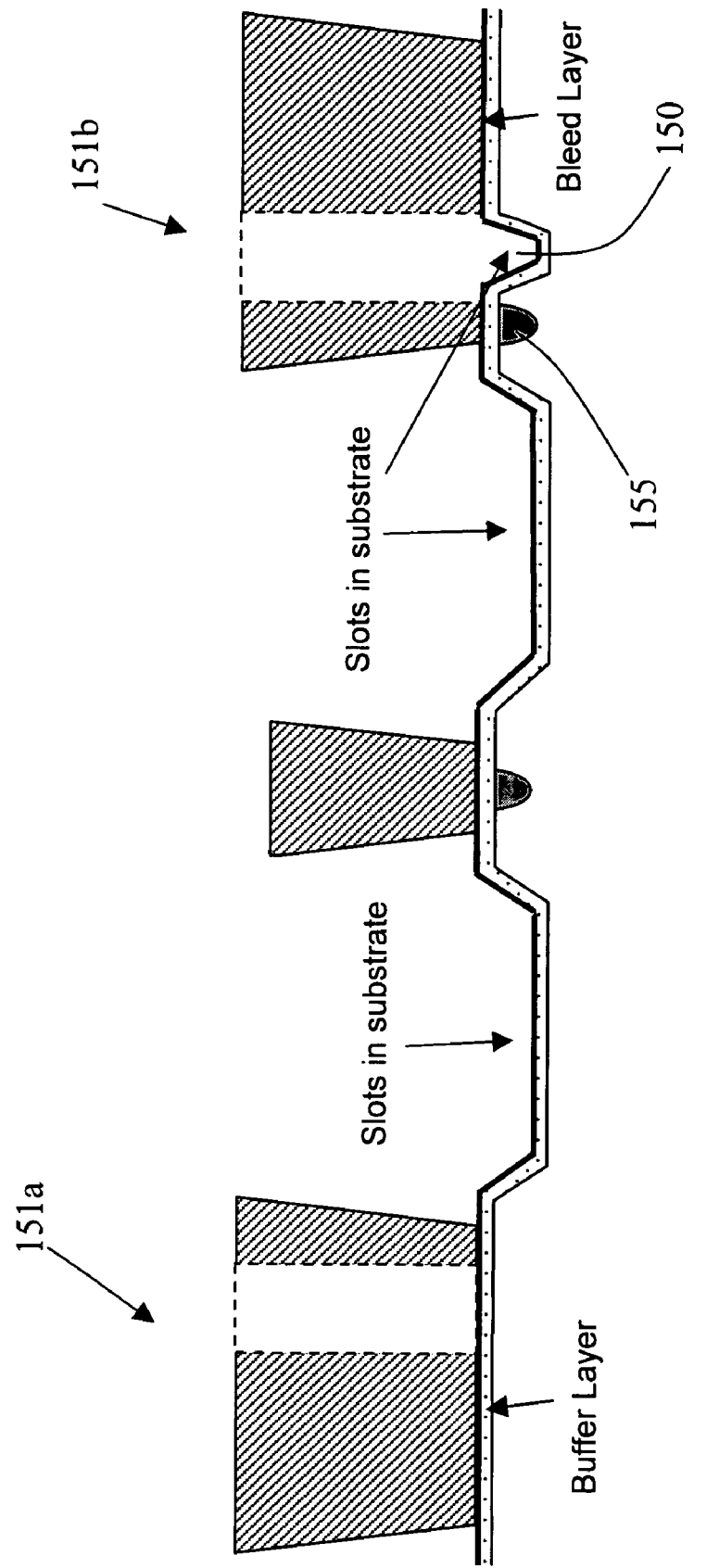
FIGS. 15 and 16 show cross section and top views, respectively, of a single slot design where both ground electrodes are slotted, however, wherein only one extra slot in the substrate near the second waveguide is provided.
Figure 16:
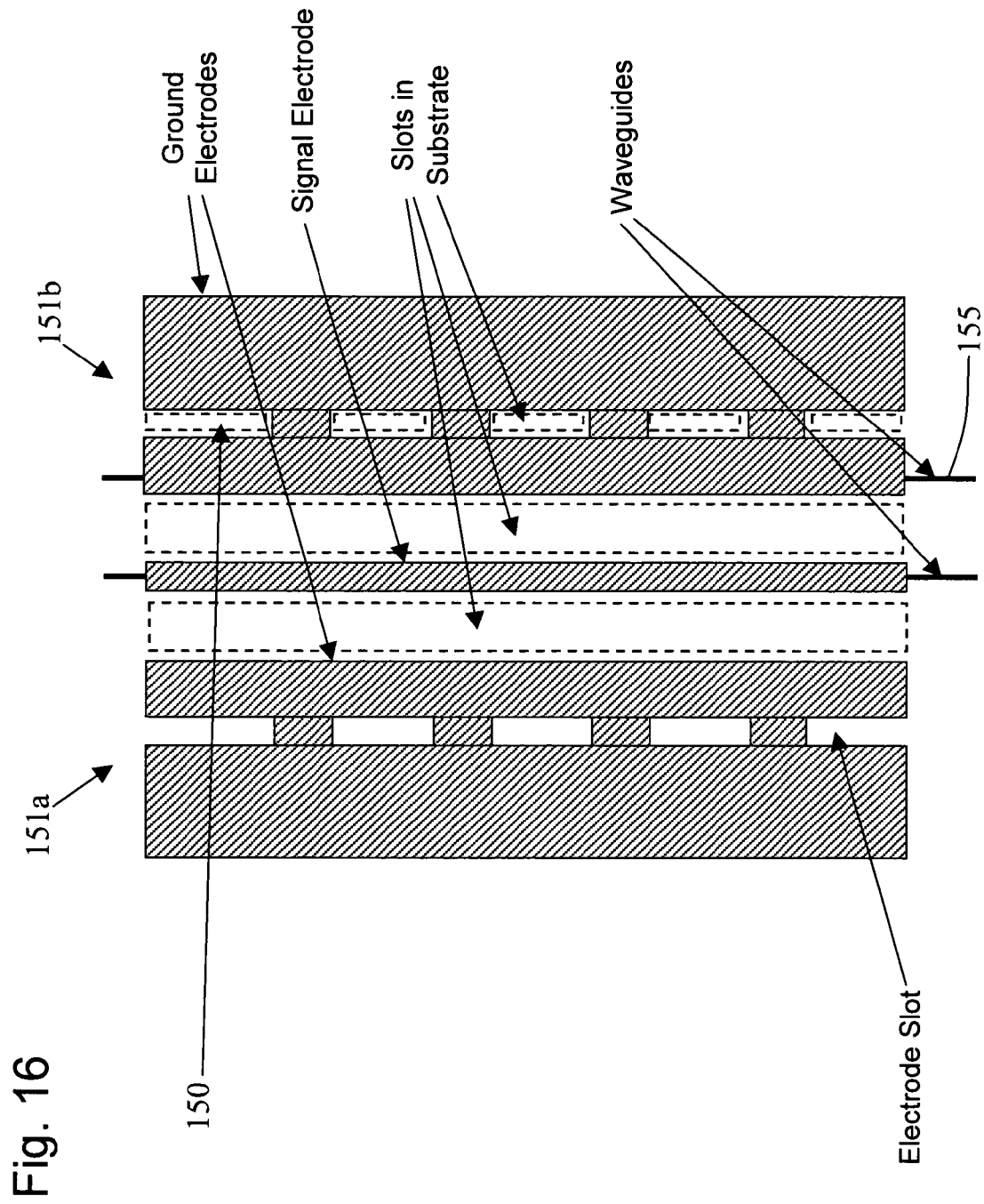

The cross section and top views in FIGS. 15 and 16, respectively, show a single slot design where both ground electrodes 151a, 151b are slotted, however, there is only one extra slot 150 in the substrate near the second waveguide 155. Providing slots in both ground electrodes 151a, 151b may be desirable in order to maintain as much electrical symmetry as possible without adding the second extra slot in the substrate.

In all the embodiments, the width of the ridged section containing the waveguides can be the same, but alternatively in other embodiments, may be different. The electrode gap between the signal and ground electrodes is typically 20 microns or wider for z-cut lithium niobate modulators. The width of the substrate slots within these electrode gaps are typically 2 to 6 microns smaller, measured at the top of the substrate slot, and bottom of the electrode gaps. The slots in the ground electrodes are typically about 10 to 20 microns wide. The extra slots in the substrate within the ground slots are 2 or more microns narrower.

In general, for best modulation efficiency, the valleys or trenches between the signal and ground electrodes should be as wide as possible, mainly limited by registration error that may put an electrode on the side of a ridge. For best mechanical symmetry, it is believed that the ridge widths should be as close to one another as possible. Maintaining mechanical symmetry assists in matching the stress changes over temperature seen by the two waveguides, reducing bias point drift over temperature.

Of course numerous other embodiments may be envisaged without departing from the spirit and scope of the invention.

What is claimed is:

1. A controllable optical device comprising:
   an electro-optic substrate including first, second and third ridges extending along a surface thereof;
   first and second waveguides extending within the first and second ridges, respectively;
   a first electrode extending over the first waveguide; and
   a second slotted electrode including a first section extending over the second waveguide, and a second section extending parallel to and adjacent to the first section on the third ridge.

2. A controllable optical device as defined in claim 1 wherein a slot is defined within the substrate between the first and second sections of the second slotted electrode, and wherein in operation, the second section is electrically coupled to the first section at high frequencies.

3. A controllable optical device as defined in claim 1 wherein both of the first and second sections are disposed on a same side of the first waveguide.

4. A controllable optical device as defined in claim 1, wherein the first electrode is a signal electrode and wherein the second slotted electrode forms a ground electrode having two electrically coupled conductors portions of which are parallel.

5. A controllable optical device as defined in claim 1, including a third electrode having at least a portion of which is parallel to the first electrode, wherein the first electrode disposed between the second electrode and the third electrode.

6. A controllable optical device as defined in claim 5, wherein the third electrode is a slotted electrode and has a first section extending over a fourth ridge and a second parallel section extending over a fifth ridge.

7. A controllable optical device as defined in claim 2, wherein slots are defined between adjacent ridges, and wherein the device is a z-cut lithium niobate modulator and is configured to form a Mach Zehnder interferometer.

8. A controllable optical device as defined in claim 7, wherein the slots are formed by etching the electro-optic substrate to remove electro-optic material.

9. A controllable optical device as defined in claim 8, wherein the slots defined within the substrate between adjacent ridges have a substantially uniform depth relative to adjacent ridges, which have a substantially uniform height.

10. A controllable Mach Zehnder interferometer as defined in claim 7 wherein at least some of the slots have a shallow end wall to promote bleed continuity and have a steep sidewall to achieve a sufficient voltage reduction, such that the sidewall is substantially steeper than the end wall.

11. An electro-optic modulator comprising:
    a z-cut lithium niobate electro-optic substrate including first, second and third ridges extending along a surface thereof;
    first and second waveguides extending within the first and second ridges, respectively, the waveguides configured as Mach Zehnder interferometer;
    a first electrode extending over the first waveguide; and
    a second slotted electrode including a first section extending over the second waveguide, and a second section extending parallel to and adjacent to the first section on the third ridge, wherein a plurality of conducting bridges span across a trench defined between the first section and the second section of the second slotted electrode.

12. An electro-optic modulator as defined in claim 11, wherein valleys are defined adjacent to and between the first, second and third ridges by removal of electro-optic material from the substrate.

13. An electro-optic modulator as defined in claim 12 further comprising a third slotted electrode, wherein the first electrode is disposed between the third slotted electrode and the second slotted electrode, and wherein in operation, the second section is electrically coupled to the first section, at high frequencies.

14. An electro-optic modulator as defined in claim 13, wherein the third electrode is a slotted electrode and has a first section extending over a fourth ridge and a second parallel section extending over a fifth ridge.

15. An electro-optic modulator as defined in claim 11 wherein the first, second and third ridges have slots defined there between within the substrate, and wherein some of the slots have a width W and wherein the other slots have a width Wo wherein Wo is less or equal to 2 W and wherein Wo is greater than or equal to ½ W.

16. An electro-optic modulator as defined in claim 11 wherein the a first electrode extending over the first waveguide is an RF electrode, and wherein the second slotted electrode is a ground electrode.

17. An electro-optic modulator as defined in claim 11, wherein the second section is electrically coupled to the first section in operation at high frequencies and wherein at DC the first and second sections are electrically isolated.

18. An electro-optic modulator as defined in claim 13 wherein the third slotted electrode has a slot defined within the substrate between slotted electrode portions of the third slotted electrode.

* * * * *